United States Patent [19]

Iwaki

[11] Patent Number: 5,229,672
[45] Date of Patent: Jul. 20, 1993

[54] METHOD OF ADJUSTING THE BALANCE OF THE ROTOR OF A VEHICLE AC GENERATOR

[75] Inventor: Yoshiyuki Iwaki, Hyogo, Japan
[73] Assignee: Mitsubishi Denki K.K., Tokyo, Japan
[21] Appl. No.: 896,681
[22] Filed: Jun. 10, 1992
[30] Foreign Application Priority Data
　Jun. 11, 1991 [JP] Japan .................... 3-167691
[51] Int. Cl.⁵ .............................................. H02K 1/22
[52] U.S. Cl. ........................................ 310/51; 310/263; 29/598
[58] Field of Search ............... 310/51, 40 R, 156, 261, 310/263; 29/598

[56] References Cited
U.S. PATENT DOCUMENTS

| | | | |
|---|---|---|---|
| 4,345,553 | 8/1982 | Magrane et al. | 310/153 |
| 4,488,070 | 12/1984 | Iwaki et al. | 310/62 |
| 4,549,341 | 10/1985 | Kasabian | 310/156 |

Primary Examiner—Steven L. Stephan
Assistant Examiner—Matthew Nguyen
Attorney, Agent, or Firm—Sughrue, Mion, Zinn, Macpeak & Seas

[57] ABSTRACT

In a method of adjusting the balance of the rotor of an AC generator which comprises a pair of magnetic pole cores with magnetic pole claws which are intertwined with each other, the amount and direction of unbalance of the rotor are detected, the amount of unbalance thus detected is divided into two components along the center lines of adjacent magnetic pole claws, a hole is drilled in the outer peripheral surface of the magnetic pole claw on which the larger of the components lies in such a manner that the hole is in alignment with the center line of the magnetic pole claw; and those operations are carried out repeatedly until the balance thus adjusted falls in a predetermined range of allowance, whereby the balance of the rotor is readily adjusted with high accuracy.

8 Claims, 3 Drawing Sheets

METHOD OF ADJUSTING THE BALANCE OF THE ROTOR OF A VEHICLE AC GENERATOR

BACKGROUND OF THE INVENTION

This invention relates to a method of adjusting the balance of the rotor of a vehicle AC generator.

FIG. 2 is a sectional view showing a vehicle AC generator which is driven, for instance, by the engine of an automobile. In FIG. 2, reference numeral 1 designates a stator; 4, a rotor. The stator comprises: a stator core 2, and a stator coil assembly 3. The rotor 4 comprises: magnetic pole cores 5 and 6 opposite in polarity, which have magnetic pole claws 5a and 6a, respectively, which, being arranged at equal angular intervals, are intertwined; an exciting coil assembly 7 held between the magnetic pole cores 5 and 6; a rotary shaft 8 on which the magnetic pole cores 5 and 6 are fixedly mounted; a pair of slip rings 9 mounted through insulating sleeves on the rotary shaft 8; and fans 10 and 11 secured to the magnetic poles 5 and 6, respectively.

Further in FIG. 2, reference numerals 12 and 13 designate a front bracket and a rear bracket, respectively, which are combined with the stator core 2 with tightening bolts 14. The front bracket 12 has a plurality of air inlet holes 12a and a plurality of air outlet holes 12b for ventilation. Similarly, the rear bracket 13 has a plurality of air inlet holes 13a and a plurality of air outlet holes 13b for ventilation. The rotary shaft 8 is supported through bearings 15 and 16 on the front bracket 12 and the rear bracket 13. A pulley 17 is fixedly mounted on the rotary shaft 8, so that rotation of the engine is transmitted through an endless belt to the pulley 17 to rotate the rotary shaft 8.

Further in FIG. 2, reference numeral 18 designates a commutator for converting AC current due to AC voltage inducted in the stator coil assembly 3 into DC current; 19, a voltage regulator for detecting a generator voltage, to control exciting current, thereby to regulate a terminal voltage to a predetermined value; and 20, brush holders for holding brushes 21 and pushing the latter against the slip rings 9.

When, in the AC generator thus constructed, the rotor 4 is rotated, AC voltage is inducted in the stator coil assembly 3; that is, the AC generator supplies electric power and produces heat. In this case, the fans 10 and 11 are also rotated to ventilate the generator, thus cooling the stator 1 and the rotor 4.

If, in the AC generator, the amount of unbalance of the rotor 4 is large, then the rotor 4 is greatly vibrated when rotated at high speed, so that it may contact the stator core 2 or at worst damage it. Hence, it is essential to adjust the balance of the rotor 4 to minimize the amount of unbalance of the latter.

A conventional method of adjusting the balance of a rotor will now be described with reference to FIG. 3. In FIG. 3, reference numerals 31 and 32 designate a pair of drills which are arranged in such a manner that they forms an interpole angle A. The drills 31 and 32 are connected to drill driving means in an automatic balance adjusting device (not shown). The aforementioned interpole angle A is the angle which adjacent magnetic pole claws 5a of the stator core 5 form with respect to the center of the latter 5. The rotor 4 is turned with the automatic balance adjusting device, so that an amount of unbalance W thereof and its direction are detected. With the amount of unbalance W as a central composite force, components U and V on the lines defining the interpole angle A, positions on the outer cylindrical surfaces of the magnetic pole claws 5a where holes are to be drilled, and the depth of the holes at the positions are calculated, to provide instruction signals. In response to the instruction signals, holes are automatically formed, as indicated at 28, with the drills 31 and 32, to correct the unbalance of the rotor.

When the above-described conventional rotor balance adjusting method is employed to form holes in the outer cylindrical surfaces of the magnetic core 5 as was described above, the holes may be positioned at any points in the range of an angle B corresponding to the circumferential width of each magnetic pole claw 5a. Hence, the holes are not uniform in depth, depending on the positions thereof (the depth of the hole is decreased as its position is shifted to an end of the circumferential width of the magnetic pole claw 5a). Thus, adjustment of the balance is relatively low in accuracy, and is sometimes difficult.

On the other hand, it is necessary to remove burrs formed by drilling. However, if, in this case, the drilled hole 18 is located near the end of the circumferential width of the outer peripheral surface of the magnetic pole claw 5a, then it is rather difficult to remove the burrs. In addition, the position of the hole is arbitrary as was described above. Hence, in the case where the balance adjusting operation is carried out repeatedly to improve the accuracy of the balance, the drilled holes overlap one another irregularly in the outer peripheral surfaces of the magnetic pole claws 5a in a circumferential direction. In order to overcome this difficulty, the correcting surfaces must be shifted axially.

Furthermore, since the drills 31 and 32 are so held as to form the interpole angle A, the conventional method cannot be applied to other rotors different in the number of poles.

SUMMARY OF THE INVENTION

Accordingly, an object of this invention is to eliminate the above-described difficulties accompanying a conventional method of adjusting the balance of the rotor in a vehicle AC generator.

More specifically, an object of the invention is to provide a method of adjusting the balance of the rotor in an AC generator which can be applied to rotors different in the number of poles.

The foregoing object and other objects of the invention have been achieved by the provision of a method of adjusting the balance of the rotor of an AC generator which rotor comprises a pair of magnetic pole cores which are fixedly mounted on a rotary shaft and have magnetic pole claws which, being extended axially, are intertwined, the rotor being excited by an exciting coil assembly interposed between the magnetic pole cores; which, according to the invention, comprises: a first step of detecting an amount of unbalance of the rotor and a direction thereof as viewed from the central axis of the rotor; a second step of dividing the amount of unbalance thus detected into two components along the center lines of magnetic pole claws which are adjacent to each other in a circumferential direction; a third step of drilling a hole in the outer peripheral surface of the magnetic pole claw on which the larger of the two components lies in such a manner that the hole is in alignment with the center line of the magnetic pole claw; and a fourth step of performing the first through third steps repeatedly until the balance thus adjusted is in a predetermined range of allowance.

In the method of the invention, the unbalance of the rotor is corrected by drilling a hole in the outer peripheral surface of the magnetic pole claw on which the larger of the components of the amount of unbalance detected lies in such a manner that the hole is in alignment with the center line of the magnetic pole claw. That is, the unbalance of the rotor can be eliminated by forming the hole with the drill, and the balance of the rotor can be adjusted with high accuracy. Moreover, in the method of the invention, burrs formed during drilling can be readily removed and one and the same tool can be used for rotors different in the number of poles.

The nature, utility and principle of the invention will be more clearly understood from the following detailed description and the appended claims when read in conjunction with the accompanying drawings.

BRIEF DESCRIPTION OF THE DRAWINGS

In the accompanying drawings:

FIG. 1 (C) is a front view of the magnetic pole core, showing another operation of drilling a hole in the other magnetic pole claw after the operation shown in FIG. 1 (A);

DETAILED DESCRIPTION OF THE INVENTION

Figure 1A:
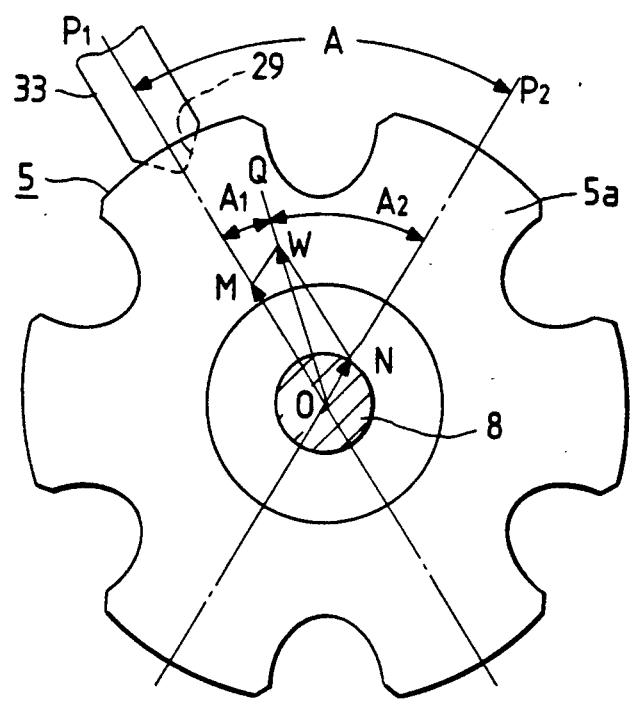
FIGS. 1 (A) and 1 (B) are a diagram for a description of a method of adjusting the balance of the rotor in an AC generator according to this invention—more specifically, FIG. 1 (A) is a front view of a magnetic pole core, showing an operation of drilling a hole in one of two adjacent magnetic pole claws, and FIG. 1 (B) is also a front view of the magnetic pole core, showing an operation of drilling a hole in the other magnetic pole claw.

One example of a method of adjusting the balance of the rotor in a vehicle AC generator according to this invention will be described with reference to FIGS. 1 and 2.

In the method, the balance of the rotor is automatically adjusted on an automatic balance adjusting device as follows:

Step (1): The rotor 4 is rotated, so that the amount and direction of unbalance thereof are detected.

Step (2): As shown in FIG. 1 (A), the angles A$_1$ and A$_2$ of the center lines OP$_1$ and OP$_2$ of magnetic pole claws 5a with the line of direction OQ of the amount of unbalance W thus detected are calculated.

Step (3): The amount of unbalance W is divided into two components M and N along the center lines OP$_1$ and OP$_2$.

Step (4): The center line OP$_1$ of the magnetic pole claw 5a having the larger M of those components M and N is set just below a drill 33, and a hole 29 is formed in the outer peripheral surface of the magnetic pole claw 5a with the drill 33 thus set in such a manner that it is in alignment with the center line OP$_1$, to eliminate the component.

Step (5): When the remaining component N is less than a predetermined value, the drilling operation is ended. When the component N is the predetermined value or more, then with respect to the component N, the amount and direction of remaining unbalance are detected similarly as in the above-described Steps (1) through (3). Then the amount of unbalance thus detected is divided into two components along the center lines of adjacent magnetic pole claws 5a.

Step (6): As regards the larger of the components obtained in the above-described Step (5), similarly as the above Step (4) a hole is formed in the outer peripheral surface of the magnetic pole claw 5a in such a manner that it is in alignment with the center line of the magnetic pole claw 5a, to eliminate the larger of the components. Theoretically stated, when, in Step (4) the component M is accurately eliminated, then only the component N remains as shown in FIG. 1 (B). If this component N is eliminated accurately, then the amount of unbalance will be zero (0).

Step (7): The above-described Steps (5) and (6) are repeatedly carried out until the balance thus adjusted is within a predetermined range of allowance.

In the above-described embodiment, the balance is adjusted by using the magnetic pole core 5; however, it goes without saying that, instead of the magnetic pole core 5, the magnetic pole core 6 may be used for adjustment of the balance of the rotor. In the case where both of the magnetic pole cores 5 and 6 are employed for adjustment of the balance of the rotor, the holes may be formed at positions spaced axially away from each other.

Figure 1B:
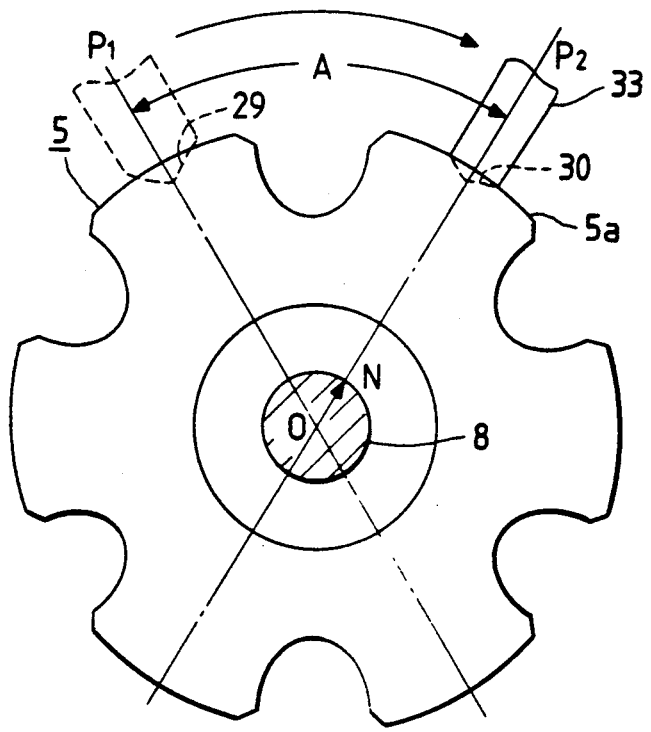
Figure 1C:
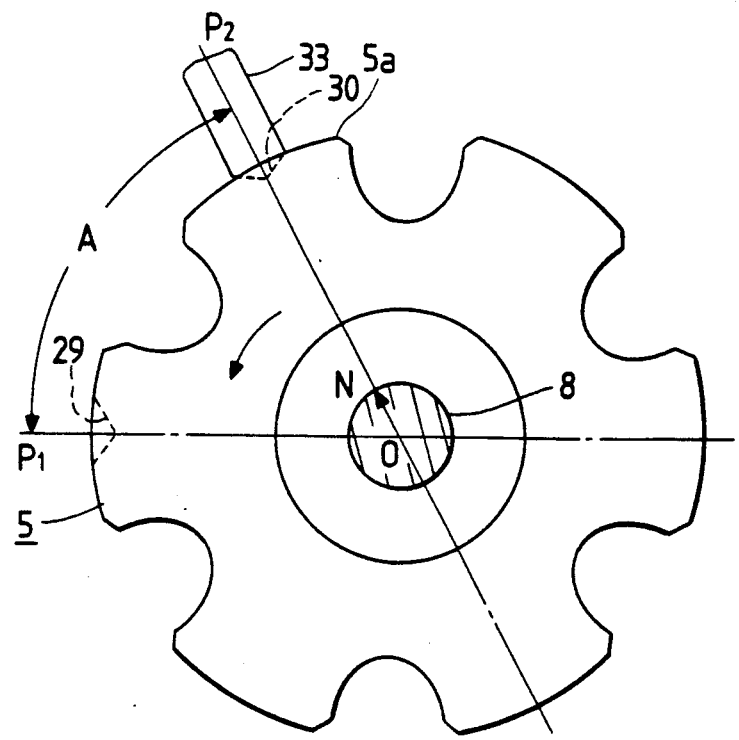
Figure 3:
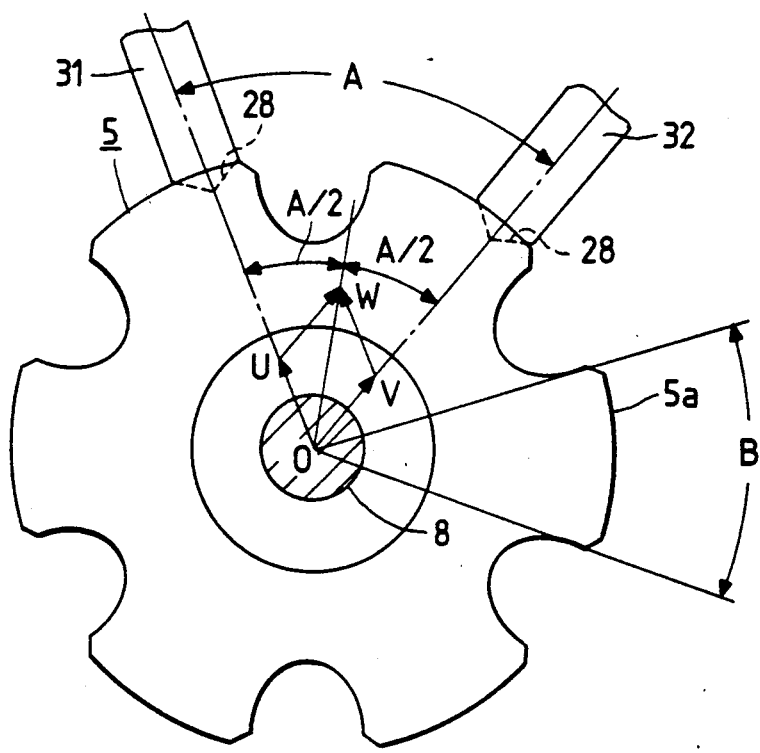
FIG. 3 is a front view of a magnetic pole core for a description of a conventional method of adjusting the balance of the rotor in a vehicle AC generator.
Figure 2:
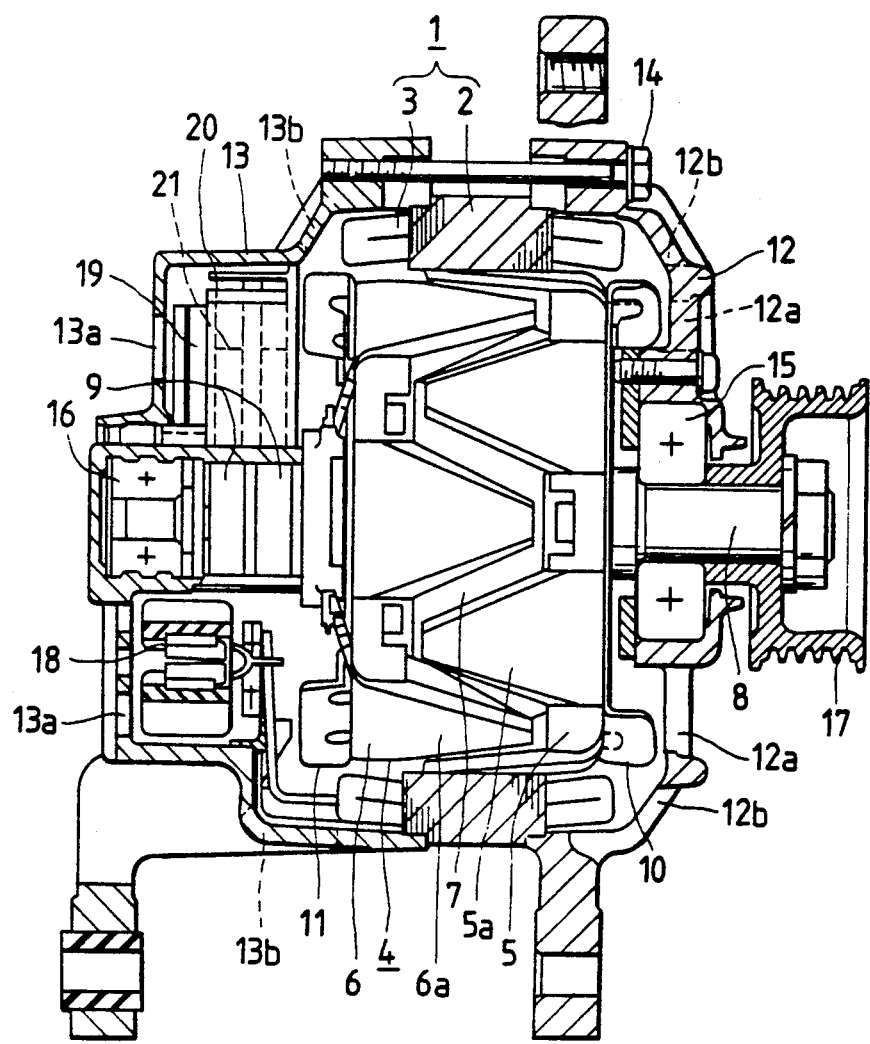
FIG. 2 is a sectional view of a vehicle AC motor in which a rotor the balance of which has been adjusted is built.

Furthermore, in the above embodiment shown in FIGS. 1 (A) and 1 (B), when the drilling operation is performed, the magnetic pole core 5 is immovable, and the drill is transferred to the position P2 from position P1. In contrast, FIG. 1 (C) shows that the drill is positioned immovably, and the magnetic pole core 5 is rotated so as to cause the drill to meet the position P2.

Additionally, since the present invention can perform the drilling operation by means of only one drill, merely by changing the program for the automatic balance adjusting device, the method of the invention can be applied to rotors different in the number of poles.

As was described above, in the method of the invention, the amount and direction of unbalance of the rotor are detected, and the amount of unbalance thus detected is divided into two components along the center lines of adjacent magnetic pole claws, and a hole is drilled in the outer peripheral surface of the magnetic pole claw on which the larger of the components lies in such a manner that the hole is in alignment with the center line of the magnetic pole claw, to remove the larger of the components. These operations are repeatedly carried out until the balance of the rotor falls in a predetermined range of allowance. Therefore, the balance of the rotor can be adjusted with ease and with high accuracy. Furthermore, burrs formed during drilling can be readily removed. Merely by changing the program for the automatic balance adjusting device, the method of the invention can be applied to rotors different in the number of poles.

What is claimed is:

1. A method of adjusting a balance of a rotor of and AC generator, the rotor comprising a pair of magnetic pole cores which have magnetic pole claws extending axially and facing each other, said method comprising:
   a first step of detecting an amount of unbalance of said rotor and a direction of the unbalance as viewed from a central axis of said rotor, said unbalance being a weight unbalance of said rotor;

a second step of calculating two components of said detected unbalance amount and direction along center lines of two adjoining magnetic pole claws, respectively, which are adjacent to each other in a circumferential direction;

a third step of drilling a hole in an outer peripheral circumferential surface of said magnetic pole claw on which the larger of said two components lies, such that said hole is in alignment with said center line of said magnetic pole claw; and a fourth step of performing said first through third steps repeatedly until the balance thus adjusted is in a predetermined range of allowance.

2. A method of adjusting a balance of a rotor of an AC generator according to claim 1, wherein in said second step, angles of said center lines of magnetic pole claws with said detected direction of unbalance are calculated, respectively.

3. A method of adjusting a balance of a rotor of an AC generator according to claim 2, wherein in said second step, said two components are calculated based on said detected amount of unbalance and said calculated angles.

4. A method according to claim 1, wherein said third step of drilling includes drilling a hole in said outer peripheral circumferential surface of said magnetic pole claw in a direction perpendicular to a rotational axis of said rotor.

5. A method according to claim 1, wherein said third step of drilling a hole in said outer peripheral circumferential surface of said magnetic pole claw includes drilling said hole in a surface of said magnetic pole claw which is parallel to a rotational axis of said rotor.

6. A method according to claim 1, further comprising determining when a smaller of said two components is less than a predetermined value, and when said smaller component of said two components is less than said predetermined value, terminating said fourth step.

7. A method according to claim 1, wherein said two magnetic pole claws are situated on one of said magnetic pole cores.

8. A method according to claim 1, wherein each of said pair of magnetic pole cores are employed for adjustment of the balance of said rotor, said third step of drilling a hole being performed at positions spaced axially away from each other on each of said magnetic pole cores such that said adjustment is performed independently on each of said magnetic pole cores.

* * * * *